United States Patent [19]

Morita

[11] Patent Number: 5,518,116
[45] Date of Patent: May 21, 1996

[54] CASE FOR A MAGNETIC TAPE CASSETTE

[75] Inventor: Kiyoo Morita, Kanagawa, Japan

[73] Assignee: Fuji Photo Film Co., Ltd., Kanagawa, Japan

[21] Appl. No.: 322,148

[22] Filed: Oct. 13, 1994

[30] Foreign Application Priority Data

Oct. 14, 1993 [JP] Japan ................. 5-060280 U

[51] Int. Cl.⁶ .................................................. B65D 85/672
[52] U.S. Cl. ............................... 206/387.1; 206/387.15; 206/307
[58] Field of Search .................... 206/387.1, 387.14, 206/387.15, 308.1, 307

[56] References Cited

U.S. PATENT DOCUMENTS

| | | | |
|---|---|---|---|
| 4,895,252 | 1/1990 | Nomula et al. | 206/310 |
| 5,154,287 | 10/1992 | Morita | 206/387.1 X |
| 5,168,991 | 12/1992 | Whitehead et al. | 206/310 |
| 5,186,325 | 2/1993 | Sato et al. | 206/232 |
| 5,284,243 | 2/1994 | Gelardi et al. | 206/310 |
| 5,341,926 | 8/1994 | Leben | 206/387.1 X |
| 5,360,105 | 10/1994 | Morita | 206/232 |
| 5,373,941 | 12/1994 | Morita | 206/387.1 |
| 5,429,237 | 7/1995 | Morita | 206/387.13 |

FOREIGN PATENT DOCUMENTS

| | | |
|---|---|---|
| 494690 | 7/1992 | European Pat. Off. . |
| 523720 | 1/1993 | European Pat. Off. . |
| 2129779 | 5/1984 | United Kingdom . |
| 2105306 | 3/1993 | United Kingdom . |

*Primary Examiner*—Bryon P. Gehman
*Assistant Examiner*—Taba L. Laster
*Attorney, Agent, or Firm*—Sughrue, Mion, Zinn, Macpeak & Seas

[57] ABSTRACT

In the storage case, rotation preventive projections 67 engageable with hubs 22 provided in a tape cassette 2 and recessed portions 81, 82, 83 for receiving the increased thickness portion 23 of the tape cassette 2 are arranged in a cover part 61 and a casing part 62 in such a manner that the tape cassette can be loaded not only forwardly but also reversely. The recessed portion 81 in the cover part 61 is formed as a recessed portion necessary not only for the forward loading but also for the reverse loading and serves also as a card storage portion for storing the index card.

5 Claims, 6 Drawing Sheets

CASE FOR A MAGNETIC TAPE CASSETTE

BACKGROUND OF THE INVENTION

The present invention relates to a case for a magnetic tape cassette and, in particular, to an improved case for a magnetic tape cassette which is used to keep an audio magnetic tape cassette.

Conventionally, a magnetic tape cassette (which will be hereinafter referred to simply as a tape cassette) for use in an audio equipment or the like includes a front opening portion into which a magnetic head is inserted when the tape cassette is loaded into a record/reproduce apparatus or the like, and a magnetic tape so mounted as to cross the front opening portion. Therefore, in order to prevent dust from going into the tape cassette through the front opening portion as well as to protect a magnetic tape exposed to the front opening portion and protect the entire the tape cassette, the tape cassette is normally kept in such a manner that it is stored in a plastic case for a magnetic tape cassette (which will be hereinafter referred to simply as a storage case).

FIGS. 10 and 11 respectively show conventional storage cases. Description will be given below of the storage cases respectively shown in these figures.

The storage case 1 shown in FIG. 10 includes a cover part 11 and a casing part 12 which is connected to the cover part 11 openably and closably. Here, the cover part 11 includes a cover side opposing wall 13 to extend along one surface of a tape cassette 2, and a pocket 14 which is disposed at one end side of the cover side opposing wall 13 and into which a front opening portion 21 of the tape cassette 2 is inserted. As shown in FIG. 10, an index card 3 and the tape cassette 2 can be inserted along the cover side opposing wall 13 into the pocket 14.

And the casing part 12 includes a casing side opposing wall 15 for covering the other surface of the tape cassette 2 loaded into the cover part 11, pivotally mounting portions 16 for connecting the casing side opposing wall 15 to the cover part 11 rotatably, and a pair of rotation preventive projections 17 respectively provided on the casing side opposing wall 15. The pivotally mounting portions 16 can be formed in such a manner that two shaft-like projections fittable into bearing holes respectively formed in the two side walls of the pocket 14 of the cover part 11 are projectingly provided in the corresponding inside portions of the casing part 12, whereby the cover part 11 and casing part 12 can be connected to each other in a mutually rotatable manner. Referring to the operation of the rotation preventive projections 17, when the casing side opposing wall 15 is rotated about the pivotally mounting portions 16 and is closed with respect to the cover part 11, the rotation preventive projections 17 are respectively engaged with hubs 22 provided in the tape cassette 2 to prevent the tape from being loosened while it is kept.

The width W1 of the index card 3 is set equal to or slightly smaller than the width W2 of the tape cassette 2.

On the other hand, the storage case 4 shown in FIG. 11 is one which is disclosed in, for example, Japanese Utility Model Publication No. Sho. 63-52782. The storage case 4 is improved in such a manner that it is made smaller in thickness to reduce the keeping space thereof. In FIG. 11, like parts as in FIG. 10 are given the same designations to thereby simplify the description thereof.

The storage case 4 is structured such that the tape cassette 2 is inserted from the opposite side of the tape cassette 2 into the storage case 4. That is, in the storage case 4, the tape cassette 2 is inserted into the pocket 14 of the cover part 11 from the rear end side thereof so that the front opening portion 21 of the tape cassette 2 is situated at the opening side of the storage case 4. And in the cover side opposing wall 13 and casing side opposing wall 15, there are respectively formed recessed portions 18 and 19 for receiving the thickness increased portion 23 of the tape cassette 2 disposed at the front opening portion 21 side thereof.

In this structure, the projecting portion of the increased thickness portion 23 of the tape cassette 2 can be absorbed within the plate thickness dimensions of the cover side and casing side opposing walls 13 and 15 to thereby be able to reduce the thickness dimension L1 of the whole storage case 4 considerably, which in turn can reduce the keeping space of the case as well as can improve the portability thereof.

For reference, in FIGS. 10 and 11, an arrow (a) indicates the opening and closing direction of the cover part 11 and an arrow (b) indicates the insertion direction of the index card 3 into the cover part 11.

In either of the above-mentioned conventional storage cases, the index card 3 is arranged such that the width dimension W0 of the title portion thereof is so set to be tightly fittable into the pocket 14 of the cover part 11, thereby preventing the index card 3 from being removed from the pocket 14. However, if the insertion and removal of the tape cassette 2 into and from the storage case 1 are repeated, then the index card 3 becomes gradually easier to slip off from the pocket 14 and, therefore, there is a possibility that, when the tape cassette 2 is taken out, the index card 3 can slip off from the pocket 14.

Also, in the storage case 4 shown in FIG. 11, since the recessed portion 18 formed in the cover side opposing wall 13 is covered with the index card 3, the increased thickness portion 23 of the tape cassette 2 becomes hard to be received by the recessed portion 18, which makes it difficult to close the cover part 11 and casing part 12 completely. Also, because part (a portion corresponding to the recessed portion 18) of the index card 3 is pressed by the increased thickness portion 23 of the tape cassette 2, there can be produced unnatural wrinkles or uneven surface portions in the index card.

In either of the storage cases 1 and 4 respectively shown in FIGS. 10 and 11, the tape cassette insertion side is preset and, thus, if the tape cassette is inserted oppositely in error, then the case cannot be closed but the insertion side of the tape cassette 2 must be corrected before it is inserted again. That is, there exists handling inconvenience in the storage cases 1 and 4.

SUMMARY OF THE INVENTION

The present invention aims at eliminating the drawbacks found in the above-mentioned conventional storage cases. Accordingly, it is an object of the invention to provide a storage case which can reduce its keeping space and improve its portability by reducing the thickness thereof, can prevent an index card from being slipped off therefrom when a tape cassette is taken out, and allows the tape cassette to be inserted from both sides thereof, thereby improving the storage case in handling.

In attaining the above object, according to the invention, there is provided a case for a magnetic tape cassette comprising a cover part having a cover side opposing wall to extend along one surface of a magnetic tape cassette for allowing the magnetic tape cassette to be inserted inside an index card along the cover side opposing wall, and a casing part including a pair of rotation preventive projections on a casing side opposing wall for preventing the rotation of hubs of the magnetic tape cassette, the cover part and casing part being pivotally mounted in a mutually openable and closable manner, in which the positions of the rotation preventive projections on the casing side opposing wall are set such that the projections can be respectively engaged with the hubs for both forward and reverse insertion of the magnetic tape cassette, the cover side and casing side opposing walls respectively include recessed portions for receiving the increased thickness portion of the magnetic tape cassette whether the tape cassette is inserted forwardly or reversely, the recessed portion of the cover side opposing wall stores the index card, and the end edge of the index card situated on the opposite side to the pivotally mounting side of the cover part is secured in the cassette take-out direction by a stepped portion provided in the edge portion of the same recessed portion.

DESCRIPTION OF THE PREFERRED EMBODIMENTS

Now, description will be given below in detail of an embodiment of a case for a magnetic tape cassette according to the invention.

Figure 1:
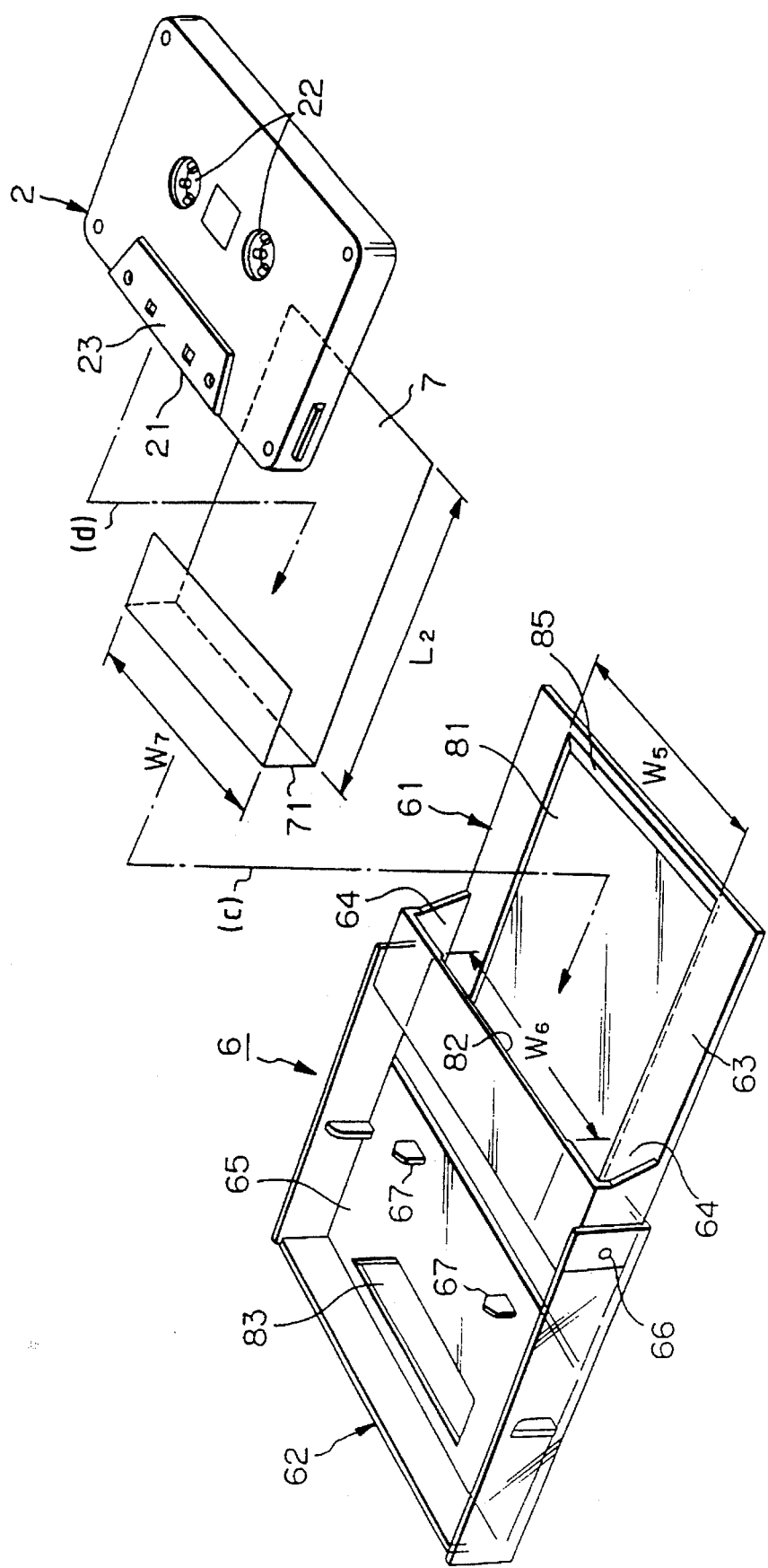
FIG. 1 is a perspective view of an embodiment of a storage case for a magnetic tape cassette according to the invention.

FIG. 1 shows an embodiment of a storage case according to the invention in terms of a perspective view. The storage case 6 according to the present embodiment, similarly to the conventional storage cases, includes a cover part 61 and a casing part 62 which is connected to the cover part in such a manner that it can be opened and closed. The cover part 61 includes a cover side opposing wall 63 to extend along one surface (in the illustrated embodiment, bottom surface) of a tape cassette 2, and a pocket 64 which is disposed at one end side of the cover side opposing wall 63 and also into which a front opening portion 21 formed in the tape cassette 2 can be inserted. That is, as shown in FIG. 1, an index card 7 and tape cassette 2 can be inserted along the cover side opposing wall 63 into the pocket 64.

On the other hand, the casing part 62 includes a casing side opposing wall 65 for covering the other surface (in the illustrated embodiment, top surface) of the tape cassette 2 loaded on the cover part 61, a pivotally mounting portion 66 for connecting the casing side opposing wall 65 to the cover part 61 rotatably, and a pair of rotation preventive projections 67 provided projectingly on the casing side opposing wall 65. Referring to the pivotally mounting portion 66, for example, a shaft-like projection fittable into one of bearing holes respectively formed in the two side walls of the pocket 64 of the cover part 61 is projectingly provided at the corresponding position of the inner wall of the casing part 62, whereby the cover part 61 and casing part 62 are connected to each other in such a manner that they can be rotated mutually to each other.

Referring now to the rotation preventive projections 67, when the casing part 62 is rotated about the pivotally mounting portion 66 and thus the casing side opposing wall 65 is closed with respect to the cover plate 61, the projections 67 are engaged with hubs 22 provided in the tape cassette 2 loaded on the cover part 61 to prevent the tape from being loosened during the storage of the tape. In the present embodiment, the positions of the rotation preventive projections 67 on the casing side opposing walls 65 are set so that the rotation preventive projections 67 can be surely engaged with the hubs 22 of the tape cassette 2 loaded on the cover part 61 whether the tape cassette 2 is loaded forwardly or reversely into the cover part 61. Also, in order to make sure that the rotation preventive projections 67 can be fitted into the hubs 22 in any case where the tape cassette 2 is loaded forwardly or reversely, each of the rotation preventive projections 67 is so set as to have a shape like a flat plate which extends along the lengthwise direction of the tape cassette 2.

Figure 2:
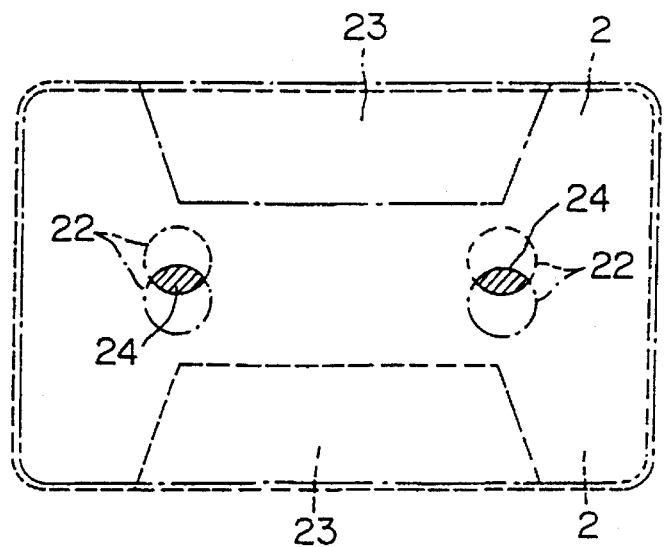
FIG. 2 is an explanatory view of hub positions with respect to the forward and reverse loading of the tape cassette.

Here, supplementary description will be given of the forward and reverse loading of the tape cassette 2. For example, if a case in which the front opening portion 21 is inserted into the pocket 64 is supposed to be the forward loading of the cassette and another case in which the rear end side of the tape cassette 2 is inserted into the pocket 64 is supposed to be the reverse loading of the cassette, then, as shown in FIG. 2, the positions of the hubs 22 to be engaged by the rotation preventive projections 67 are shifted according to the forward and reverse loading of the tape cassette 2 (in FIG. 2, the tape cassette 2 when it is loaded forwardly is shown by one-dot chained lines, while the tape cassette 2 when it is loaded reversely is shown by broken lines). The positions of the hubs 22 when the tape cassette 2 is loaded forwardly share areas 24, as shown by oblique lines in FIG. 2, in common with the positions of the hubs 22 when the tape cassette 2 is loaded reversely.

The positions on the casing side opposing wall 65 corresponding to the common areas 24 are the positions in which the rotation preventive projections 67 are provided.

And in the cover side opposing wall 63, pocket 64, and casing side opposing wall 65, there are respectively formed recessed portions 81, 82, and 83 respectively for receiving the increased thickness portion 23 of the tape cassette 2 in order to allow both forward and reverse loading of the tape cassette 2 into the cover part 61.

The recessed portion 82 formed in the pocket 64, as shown in FIG. 1, is arranged to receive the increased thickness portion 23 when the front opening portion 21 is inserted into the pocket 64, that is, when the tape cassette 2 is loaded forwardly. Also, the recessed portion 83 formed in the casing side opposing wall 65 is arranged to receive the increased thickness portion 23 when the rear end side of the tape cassette 2 is inserted into the pocket 64 (that is, when the front opening portion 21 is located at the opening end side of the storage case), or, in the reverse loading of the tape cassette 2.

On the other hand, the recessed portion 81 formed in the cover side opposing wall 63 is formed in a single rectangular recessed portion which is an integrated portion consisting of a forward loading recessed portion for receiving the increased thickness portion 23 in the forward loading and a reverse loading recessed portion for receiving the increased thickness portion 23 in the reverse loading. The width dimensions W5 and W6 of the two recessed portions 81 and 82 are equal to each other.

Also, the index card 7 is arranged such that the width dimension W7 thereof is slightly smaller, 0.01–0.5 mm smaller, for example, than the width dimension W5 of the recessed portion 81 and the length dimension L2 extending along the cover side opposing wall 63 is slightly smaller than the length dimension L3 (see FIG. 3) of the recessed portion 81.

Therefore, the recessed portion 81 formed as a single rectangular recessed portion serves also as a card storage portion which stores the index card 7 therein and secures the end edge of the index card 7 by means of a stepped portion 85 provided in the edge of the recessed portion at an end side of the cover side opposing wall 63 opposite to the end side at which the pocket 64 is disposed.

Here, in FIG. 1, arrows (c) and (d) respectively show the direction of insertion of the index card 7 into the cover part 61 and the direction of insertion of the tape cassette 2 into the cover part 61.

Figure 3:
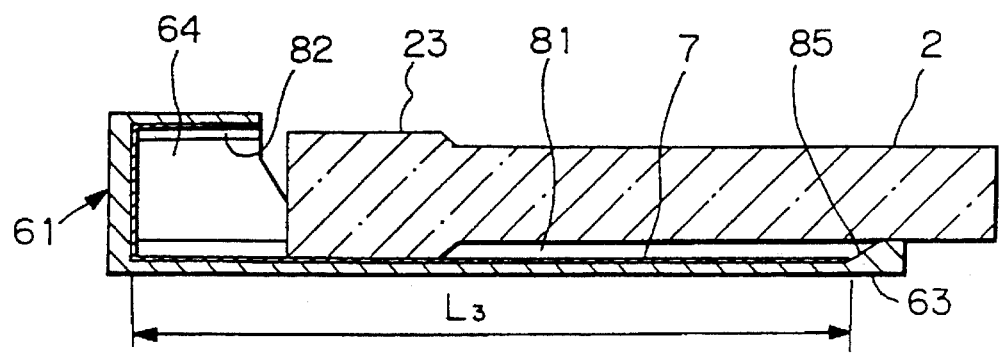
FIG. 3 is an explanatory view when the tape cassette is loaded onto a cover part in the above embodiment shown in FIG. 1.
Figure 4:
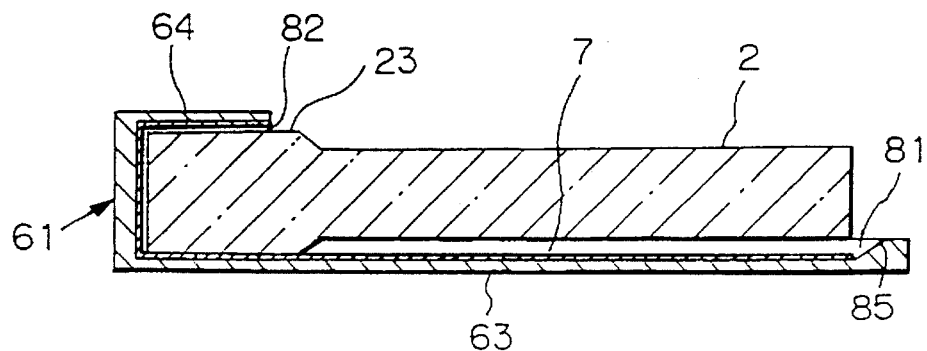
FIG. 4 is an explanatory view when the tape cassette is loaded onto the cover part in the above embodiment.

Now, FIG. 3 shows a state before the tape cassette 2 is inserted into the pocket 64 with the index card 7 mounted therein, and FIG. 4 shows a state in which the increased thickness portion 23 of the tape cassette 2 is inserted in the pocket 64.

Figure 5:
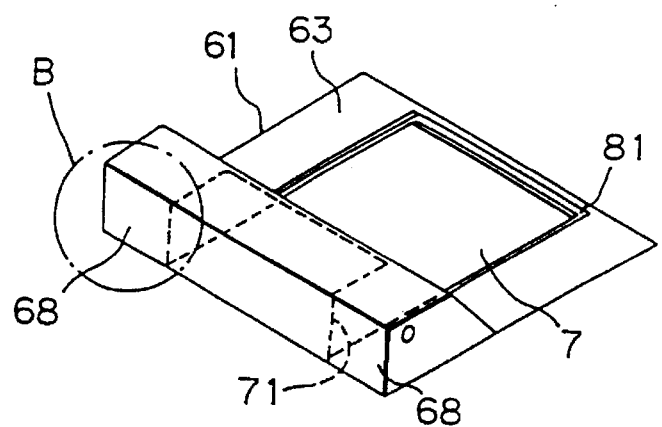
FIG. 5 is a perspective view to show a relationship between the cover part and index card in the above embodiment.
Figure 6:
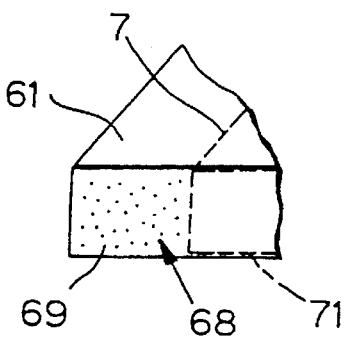
FIG. 6 is an enlarged explanatory view of a portion B shown in FIG. 5.

In the present embodiment, since the width dimension W7 of the index card 7 is smaller than the width dimension W2 of the tape cassette 2, as shown in FIG. 5 as well, when the index card 7 is mounted in the cover part 61, there are left areas 68 in which the index card 7 is not present (which areas will hereinafter be referred to as space areas), on both sides of a title portion 71 of the index card 7. The cover part 61 is ordinarily formed of transparent plastic so that the description contents of the index card can be visually understood with ease from outside the case. In the present embodiment, as shown in FIG. 6, engravings 69 are provided on the case inner surface corresponding to the space areas 68 so that the space areas 68 can be matched to the title portion 71 in the case in terms of design.

Figure 7:
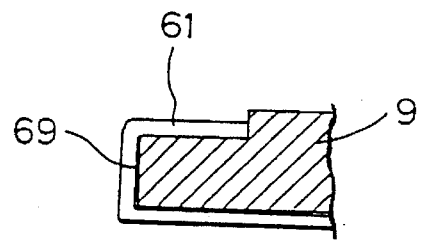
FIG. 7 is an explanatory view of working on a space area produced in the above embodiment.
Figure 8:
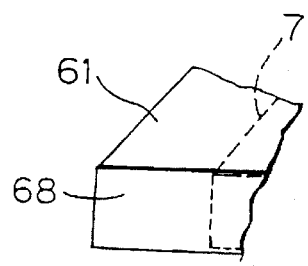
FIG. 8 is an explanatory view of working on a space area produced in the above embodiment.

In FIG. 7, there is shown a method of enforcing a working operation such as the engravings 69 on the space areas 68. In this figure, as means for enforcing the engravings, there can be applied a slide core 9 which is used in a forming and working step. The working on the inner surfaces of the space areas 68 may include opaquing working such as opaquing the space areas with fleckles and, besides, as shown in FIG. 8, characters such as TITLE can be engraved on the space areas 68.

In the above-mentioned storage case 6 according to the above embodiment, since the recessed portions 81, 82 and 83 for receiving the increased thickness portion 23 of the tape cassette 2 are respectively formed in the cover side opposing wall 63, pocket 64 and casing side opposing wall 65, the projecting portion of the increased thickness portion 23 of the tape cassette 2 can be absorbed within the plate thickness dimensions of the cover side and casing side opposing walls 63, 65 and the like and thus, as the whole storage case, the thickness dimension thereof can be reduced, that is, the storage case can be made into a thinner shape. The thinner shape can reduce its keeping space and also can improve its portability.

Also, because the recessed portions 81, 82 and 83 respectively formed in the cover part 61 and casing part 62 as well as the rotation preventive projections 67 are arranged in such a manner that they can be adapted to both forward and reverse loading of the tape cassette 2, the tape cassette can be inserted both forwardly and reversely. This eliminates an inconvenience that the tape cassette must be loaded again when it has been loaded from the wrong side. That is, the present structure allows the tape cassette to be loaded quite freely.

Further, as described before, the recessed portion 81 formed in the cover side opposing wall 63 is formed in a single rectangular recessed portion which is an integrated portion consisting of the forward loading recessed portion for receiving the increased thickness portion in the forward loading of the tape cassette and the reverse loading recessed portion for receiving the increased thickness portion in the reverse loading. And the recessed portion 81 serves also as a card storage portion which not only stores the index card 7 but also secures the end edge of the index card 7 by means of the stepped portion 85 provided in the edge of the recessed portion 81. This structure can prevent the index card 7 from slipping off when the tape cassette 2 is taken out, and also can prevent generation of unnatural wrinkles and uneven surface portions in the index card 7, thereby being able to improve the handling property and commercial value of the case.

Also, since none of the recessed portions 81, 82 and 83 reaches the corners of the storage case, the strength of the case corners, which has an important significance on the drop speed of the storage case, is prevented from being lowered in spite of the fact that the case is made thinner due to formation of the recessed portions.

Although in the above embodiment there is shown the storage case 6 which stores the tape cassette 2 sideways, there can also be employed a storage case which stores the tape cassette 2 vertically.

Figure 9:
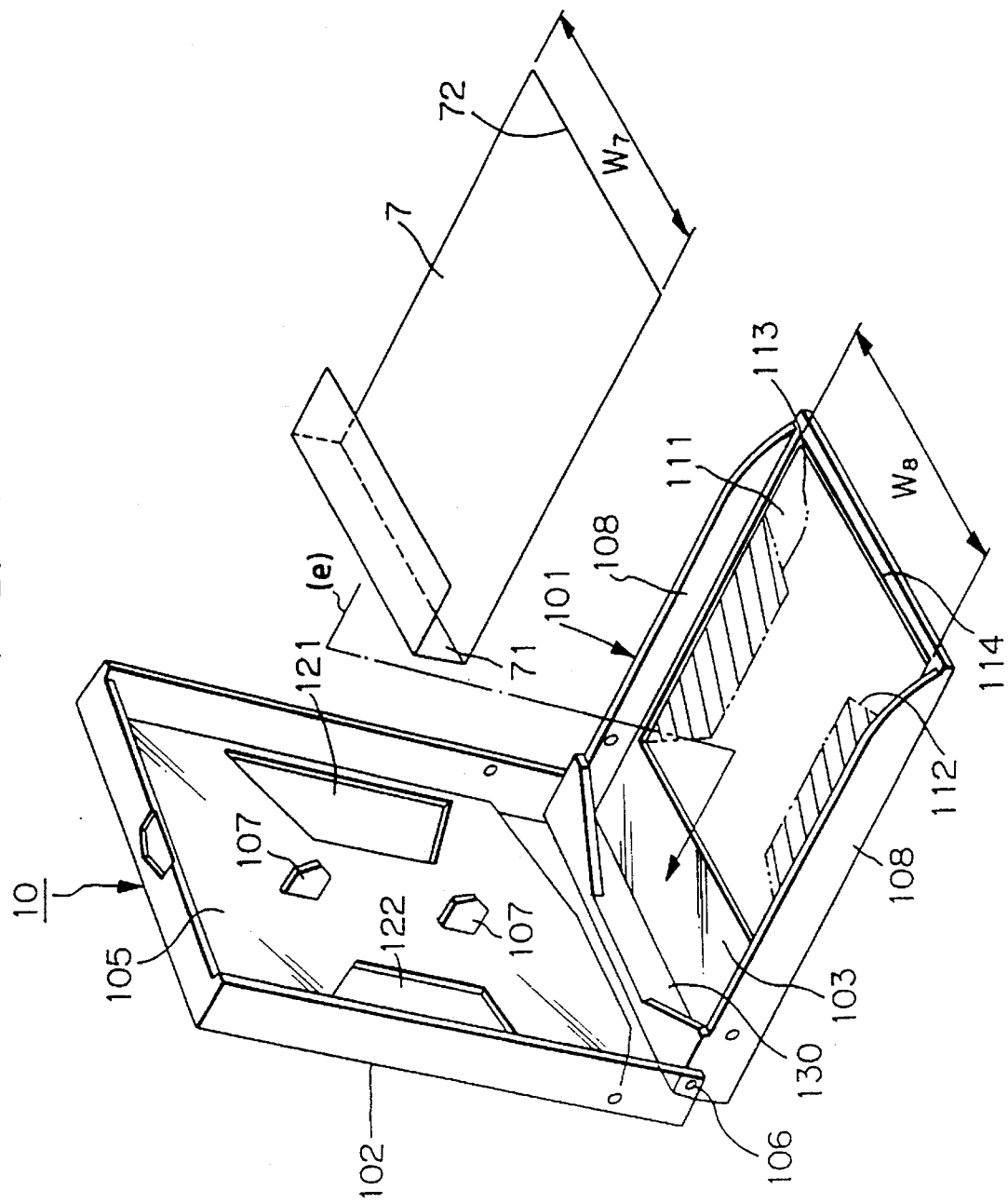
FIG. 9 is a perspective view of a second embodiment of a storage case for a magnetic tape cassette according to the invention.
Figure 10:
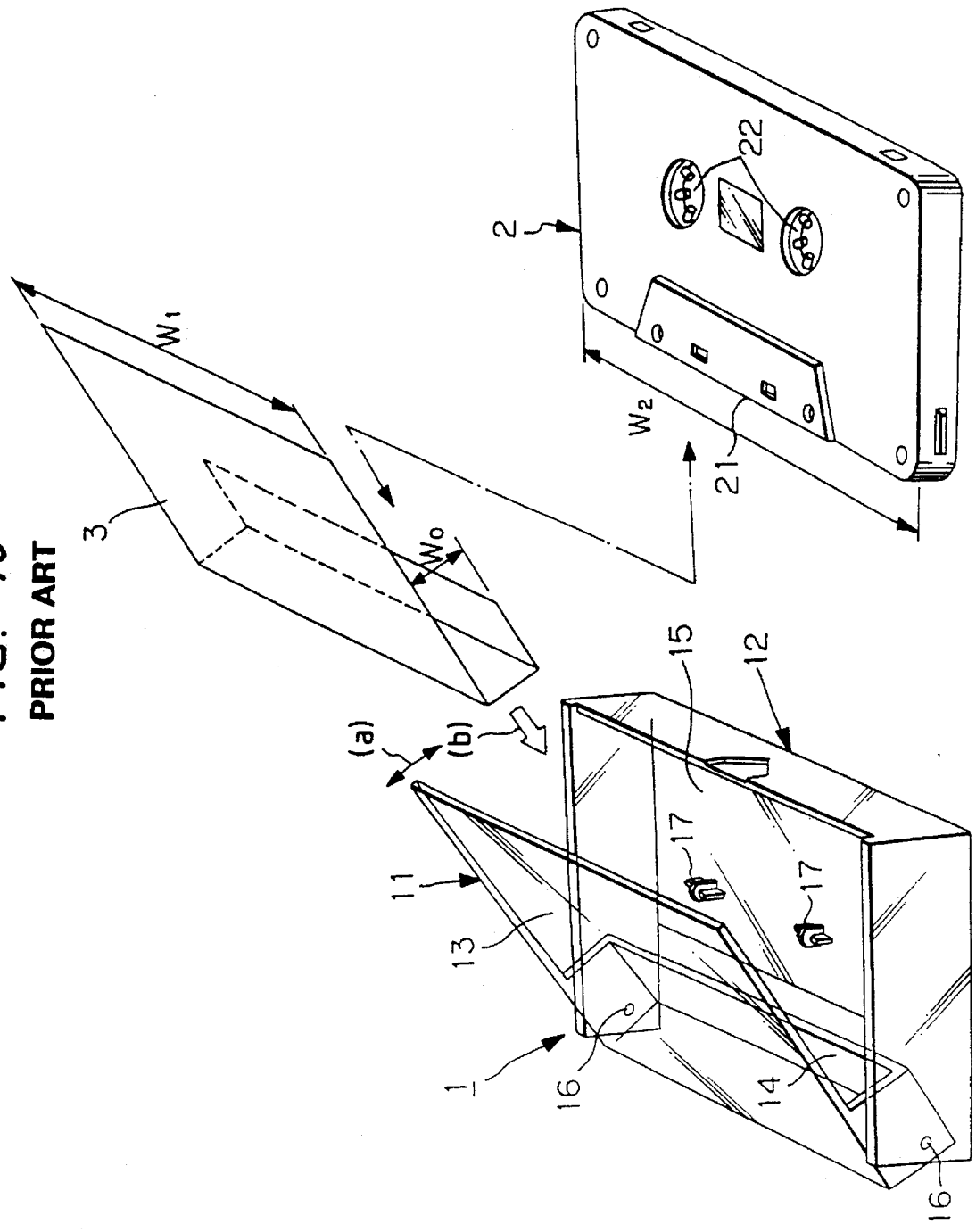
FIG. 10 is a perspective view of the structure of a conventional case for a magnetic tape cassette.
Figure 11:
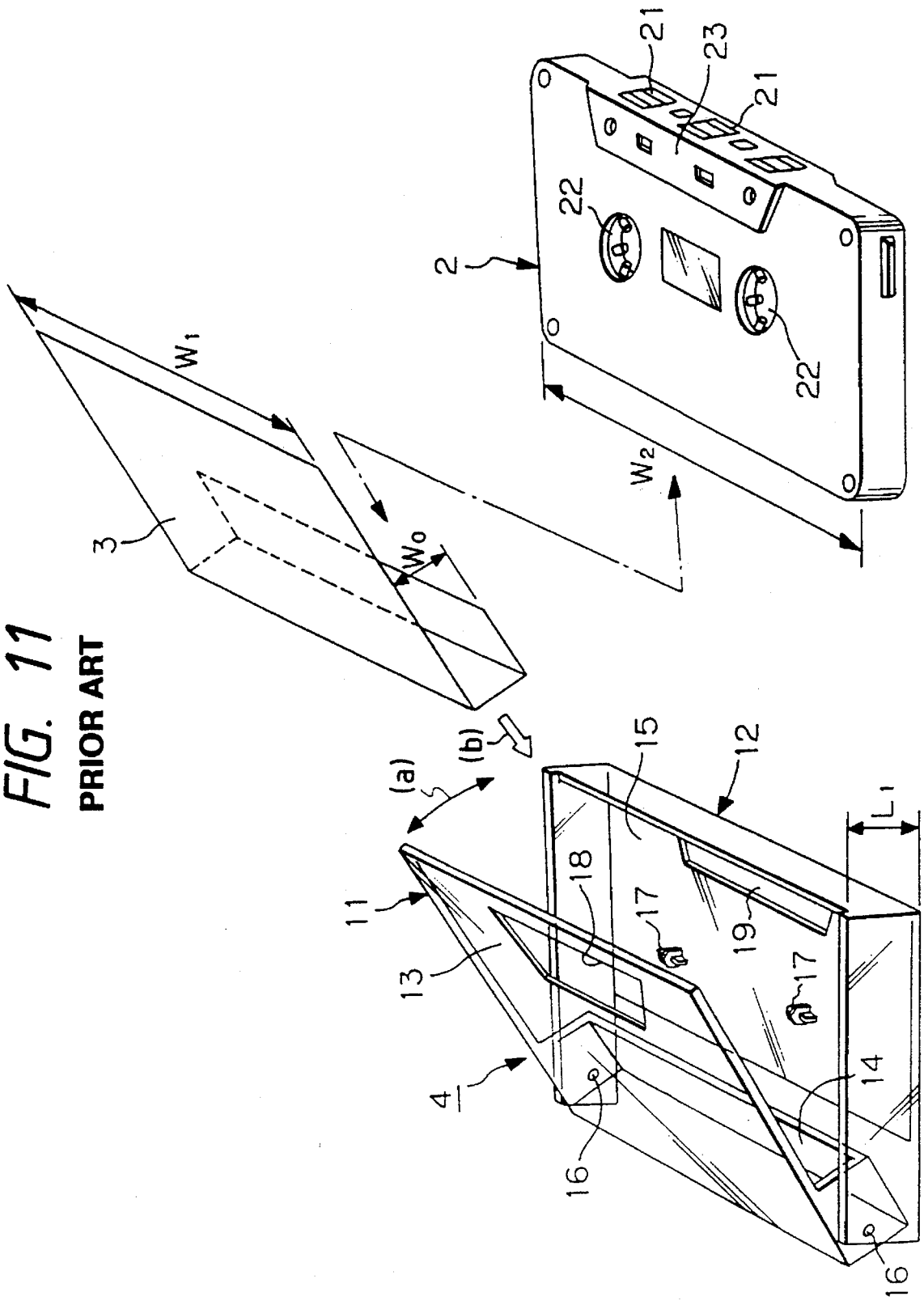
FIG. 11 is a perspective view of the structure of another conventional case for a magnetic tape cassette.

Referring now to FIG. 9, there is shown another embodiment of a storage case according to the invention. That is, in FIG. 9, there is shown a storage case 10 into which the tape cassette 2 can be loaded vertically.

The storage case 10 is similar in basic structure to the previously described embodiment. That is, the storage case 10 includes a cover part 101 and a casing part 102 which is connected to the cover part 101 openably and closably. And the cover part 101 includes a cover side opposing wall 103 to extend along one surface of the tape cassette and thus the index card 7 and tape cassette can be inserted into and removed from the storage case along the cover side opposing wall 103.

Also, the casing part 102 includes a casing side opposing wall 105 for covering the other surface of the tape cassette loaded on the cover part 101, a pivotally mounting portion 106 for connecting the casing side opposing wall 105 to the cover part 101 rotatably, and a pair of rotation preventive projections 107 which are respectively provided on the casing side opposing wall 105 and are engageable with hubs provided in the tape cassette loaded on the cover part 101 when the casing side opposing wall 105 is rotated about the pivotally mounting portion 106 and is closed with respect to the cover part 101.

The projection positions of the rotation preventive projections 107 on the casing side opposing wall 105 are set such that the rotation preventive projections 10 are engageable with the hubs of the tape cassette loaded on the cover part 101 in both cases when the tape cassette is loaded onto the cover part 101 forwardly and reversely.

Also, in the cover side opposing wall 103 and casing side opposing wall 105, there are formed recessed portions 111, 121, 122 for receiving the increased thickness portion of the tape cassette in order to allow the tape cassette to be loaded onto the cover part 101 not only forwardly but also reversely.

The recessed portion 111 formed in the cover side opposing wall 103 is formed as a single rectangular recessed portion which can be formed by integrating a forward loading recessed portion 112 for receiving the increased thickness portion of the tape cassette in the forward loading and a reverse loading recessed portion 113 for receiving the increased thickness portion in the reverse loading into a united portion. And the recessed portion 111 serves also as a card storage portion which not only stores the index card 7 but also secures the end edge of the index card 7 by means of a stepped portion 114 provided in the edge of the recessed portion 111.

An arrow (e) shown in FIG. 9 designates the insertion direction of the index card 7 into the cover part 101. In the case of the storage case 10, since the tape cassette is inserted vertically into the storage case 10, the cover side opposing wall 103 is long vertically. In order to secure the strength of the cover side opposing wall 103, two side walls 108 are provided on both sides of the cover side opposing walls 103.

In the storage case 10, similarly to the previously described embodiment, the width dimension W7 of the index card 7 is set slightly smaller than the width dimension W8 of the recessed portion 111 in the cover side opposing wall 103. Also, similarly to the previously described embodiment, when the index card 7 is loaded on the cover part 101, not only the title portion 71 of the index card 7 is in contact with the front wall 130 of a pocket formed in the cover part 101 but also the end edge 72 of the index card 7 is secured to the stepped portion 114 of the recessed portion 111; and the securing of the end edge 72 of the index card 7 by the stepped portion 114 prevents the removal of the index card 7.

In the present embodiment as well, the reduction in the case thickness can reduce its keeping space and can improve its portability. Also, the structure of the present embodiment can prevent removal of the index card 7. Further, unnatural wrinkles and uneven surface portions are difficult to occur in the index card 7. In addition, the present embodiment allows the tape cassette to be inserted not only forwardly but also reversely and is thus improved in its handling property.

As has been described heretofore, according to a storage case for a magnetic tape cassette of the invention, due to the fact that a cover side opposing wall and a casing side opposing wall respectively include recessed portions for receiving the increased thickness portion of the magnetic tape cassette, the projecting portion of the increased thickness portion of the tape cassette can be absorbed within the plate thickness dimensions of the cover side and casing side opposing walls and, thus, as the whole storage case, the thickness dimension thereof can be reduced considerably to provide a thinner storage case; and such reduction of the thickness can reduce its keeping space as well as can improve its portability. Also, since the recessed portions formed in the cover and casing parts as well as rotation preventive projections provided in the casing part are so arranged as to allow the magnetic tape cassette to be loaded not only forwardly but also reversely, the magnetic tape cassette can be inserted not only forwardly but also reversely, which eliminates an inconvenience that the magnetic tape cassette must be inserted again when it has been inserted in a wrong way.

Also, the recessed portion formed in the cover side opposing wall is formed in an integrated recessed portion consisting of a forward loading recessed portion for receiving the increased thickness portion of the tape cassette in the forward loading and a reverse loading recessed portion for receiving the increased thickness portion in the reverse loading, and the recessed portion serves also as a card storage portion which not only stores the index card but also secures the end edge of the index card by means of a stepped portion provided in the edge of the recessed portion. This structure can prevent the index card from being removed from the storage case when the tape cassette is taken out as well as can prevent unnatural wrinkles or uneven surface portions from occurring in the index card, thereby being able to improve the handling property and commercial value of the storage case.

What is claimed is:

1. A magnetic tape cassette accommodating case for accommodating a magnetic tape cassette, the magnetic tape cassette including a pair of rotatable hubs and an increased thickness portion which defines a front tape access opening, said magnetic tape cassette accommodating case comprising:

a) a cover part including a cover side opposing wall which extends along one surface of the magnetic tape cassette, a pocket disposed at one end side of said cover side opposing wall and for receiving at least a portion of the magnetic tape cassette, and a single, substantially rectangular recessed portion formed in said cover side opposing wall and operative to receive the increased thickness portion of the magnetic tape cassette, said single, substantially rectangular recessed portion defining a length and a width dimension;

b) an index card having a cover side wall portion and a pocket portion, said cover side wall portion having a width dimension which is slightly smaller than the width dimension of said single, substantially rectangular recessed portion so that said cover side wall portion is stored in said single, substantially rectangular recessed portion; and c) a casing part including a casing side opposing wall and a pair of rotation preventive projections disposed on said casing side opposing wall for preventing rotation of the hubs, a further recessed portion formed in said casing side opposing wall and operative to receive the increased thickness portion of the magnetic tape cassette, said cover part and said casing part being pivotally interconnected with one another in an openable and closable manner, d) whereby said single, substantially rectangular recessed portion and said further recessed portion permit the increased thickness portion of the magnetic tape cassette to be accommodated within said magnetic tape cassette case independently of a direction of insertion of said magnetic tape cassette, wherein said single, substantially rectangular recessed portion includes a stepped portion for engaging an end edge of said cover side wall portion of said index card, said steered portion being provided at an end side of said cover side opposing wall opposite to the one end side at which said pocket is disposed.

2. The magnetic tape cassette accommodating case according to claim 1, wherein said pocket receives the increased thickness portion of the magnetic tape cassette.

3. The magnetic tape cassette accommodating case according to claim 1, wherein said single, substantially rectangular recessed portion has the length and the width dimension so as to receive the entire said cover side wall portion of said index card.

4. The magnetic tape cassette accommodating case according to claim 1, wherein said pocket receives one side-end portion of the magnetic tape cassette.

5. The magnetic tape cassette accommodating case according to claim 1, wherein said casing side opposing wall has a pair of recessed portions for receiving said increased thickness portion of the magnetic tape cassette.

* * * * *